United States Patent
Myers et al.

(10) Patent No.: US 12,298,772 B2
(45) Date of Patent: May 13, 2025

(54) TRANSITION TO SAFE STATE BASED ON AGE/INTEGRITY OF CRITICAL MESSAGES

(71) Applicant: Zoox, Inc., Foster City, CA (US)

(72) Inventors: Matthew Thomas Myers, San Francisco, CA (US); Nicholas Julian Pelly, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 60 days.

(21) Appl. No.: 16/226,275

(22) Filed: Dec. 19, 2018

(65) Prior Publication Data
US 2020/0201336 A1 Jun. 25, 2020

(51) Int. Cl.
*G05D 1/00* (2024.01)
*G07C 5/00* (2006.01)

(52) U.S. Cl.
CPC ......... *G05D 1/0214* (2013.01); *G05D 1/0022* (2013.01); *G05D 1/0088* (2013.01); *G05D 1/0276* (2013.01); *G07C 5/008* (2013.01)

(58) Field of Classification Search
CPC .. G05D 1/0214; G05D 1/0022; G05D 1/0088; G05D 1/0276; G07C 5/008; G08G 1/096708
See application file for complete search history.

(56) References Cited

U.S. PATENT DOCUMENTS

| | | | |
|---|---|---|---|
| 6,349,406 B1 | 2/2002 | Levine | |
| 6,557,167 B1 | 4/2003 | Thelen | |
| 7,729,827 B2 | 6/2010 | Kohei et al. | |
| 9,003,028 B2 | 4/2015 | Fukui et al. | |
| 2005/0120104 A1 | 6/2005 | Boon et al. | |
| 2006/0031695 A1 | 2/2006 | Isozaki et al. | |
| 2008/0049633 A1 | 2/2008 | Edwards et al. | |
| 2012/0036250 A1 | 2/2012 | Vaswani et al. | |
| 2012/0303348 A1 | 11/2012 | Lu et al. | |
| 2013/0080843 A1* | 3/2013 | Stergiou | G06F 11/14 714/49 |
| 2013/0111012 A1 | 5/2013 | Gupta et al. | |
| 2013/0160024 A1 | 6/2013 | Shtilman et al. | |

(Continued)

FOREIGN PATENT DOCUMENTS

| CN | 1734438 A | 2/2006 |
|---|---|---|
| EP | 1388474 A2 | 2/2004 |

(Continued)

OTHER PUBLICATIONS

PCT Search Report and Written Opinion mailed on Apr. 8, 2020 for PCT Application No. PCT/US2019/067506, 23 pages.

(Continued)

*Primary Examiner* — Ig T An
(74) *Attorney, Agent, or Firm* — Lee & Hayes, P.C.

(57) ABSTRACT

Autonomous vehicles rely on many types of information for operation. Such information may include safety critical information, which may be information essential to safe operation of the system. In an example, a vehicle system may identify events associated with critical information. Events may include failing to receive critical information as expected or determining that received critical information is unsuitable, for example, because it is too old, invalid, or otherwise lacking integrity. In some examples, based at least in part on determining the event, the vehicle may be controlled in a safe state.

20 Claims, 5 Drawing Sheets

(56) References Cited

U.S. PATENT DOCUMENTS

| | | |
|---|---|---|
| 2013/0204484 A1 | 8/2013 | Ricci et al. |
| 2014/0215058 A1 | 7/2014 | Vicat-Blanc et al. |
| 2014/0320500 A1 | 10/2014 | Fletcher et al. |
| 2014/0333468 A1 | 11/2014 | Zhu et al. |
| 2015/0066282 A1 | 3/2015 | Yopp |
| 2015/0246672 A1 | 9/2015 | Pilutti et al. |
| 2016/0180811 A1 | 6/2016 | Colenbrander |
| 2017/0124129 A1 | 5/2017 | Chen et al. |
| 2017/0293295 A1* | 10/2017 | Tani ............... A01B 69/00 |
| 2018/0011485 A1* | 1/2018 | Ferren ............. G05D 1/0038 |
| 2018/0046671 A1 | 2/2018 | Baba et al. |
| 2018/0050704 A1 | 2/2018 | Tascione |
| 2018/0060127 A1 | 3/2018 | Esterkin et al. |
| 2018/0102947 A1 | 4/2018 | Bhaya et al. |
| 2018/0197418 A1 | 7/2018 | Chu et al. |
| 2018/0304828 A1 | 10/2018 | Kitani |
| 2018/0316699 A1 | 11/2018 | David et al. |
| 2018/0349205 A1 | 12/2018 | Kolluru |
| 2018/0356837 A1 | 12/2018 | Lisewski et al. |
| 2019/0152472 A1 | 5/2019 | Aksyutina et al. |
| 2019/0156678 A1 | 5/2019 | Cole |
| 2019/0340094 A1 | 11/2019 | Lu et al. |
| 2019/0364502 A1* | 11/2019 | Agerstam ............. H04W 4/38 |
| 2019/0382031 A1* | 12/2019 | Hu ............... B60W 60/00186 |
| 2020/0068434 A1* | 2/2020 | Pedersen ............. G06T 5/008 |
| 2020/0201322 A1 | 6/2020 | Somers et al. |
| 2020/0201335 A1 | 6/2020 | Somers et al. |

FOREIGN PATENT DOCUMENTS

| | | |
|---|---|---|
| EP | 3203339 | 8/2017 |
| EP | 3203339 A1 | 8/2017 |
| JP | 2007126127 A | 5/2007 |
| JP | 2013047922 A | 3/2013 |
| RU | 2010121514 A | 12/2011 |
| WO | WO03060416 | 7/2003 |
| WO | WO03060416 A1 | 7/2003 |
| WO | WO2014024863 A1 | 2/2014 |
| WO | WO2017079321 A1 | 5/2017 |
| WO | WO2017079349 A1 | 5/2017 |
| WO | WO2017148239 A1 | 9/2017 |
| WO | WO2018014282 A1 | 1/2018 |
| WO | WO2018066041 A1 | 4/2018 |
| WO | WO2018138775 A1 | 8/2018 |

OTHER PUBLICATIONS

PCT Search Report and Written Opinion mailed on Mar. 19, 2020 fo PCT Application No. PCT/US2019/067584, 7 pages.

Non Final Office Action dated Dec. 23, 2020 for U.S. Appl. No. 16/225,997, "Safe System Operation Using Latency Determinations" Somers, 19 pages.

Office Action for U.S. Appl. No. 16/226,128, mailed on May 27, 2021, Somers, "Safe System Operation Using CPU Usage Information ", 7 pages.

Partial European Search Report mailed Aug. 1, 2022 for European Patent Application No. 19899245.5, 13 pages.

Extended European Search Report mailed Dec. 13, 2022 for European Patent Application No. 19899245.5, 13 pages.

Chinese Office Action mailed May 15, 2023 for Chinese patent application No. 201980084468.4, a foreign counterpart of U.S. Pat. No. 11,099,573, 22 pages.

Wu, et al., "An Out-of-band Authentication Scheme for Internet of Things Using Blockchain Technology," IEEE 2018 International Conference on Computing, Networking, and Communications (ICNC), Maui, HI, USA, 2018, pp. 769-773.

* cited by examiner

TRANSITION TO SAFE STATE BASED ON AGE/INTEGRITY OF CRITICAL MESSAGES

BACKGROUND

Autonomous vehicles utilize information from a variety of sources to navigate through an environment. For example, such vehicles require information about the environment, about objects in the environment, about a status of components of the vehicle, about a determined trajectory or path through the environment, or the like. While some of the information may be useful, certain data may be critical to safe functioning of the vehicle. However, in some instances, information of the type(s) just described, including critical information, may not be received, or, if received, may be unsuitable for use by the vehicle systems for proper functioning. In some examples, these shortcomings may require increased processing time to better understand the data, may result in decreased efficiency in identifying and/or characterizing objects that may be potential obstacles to safe travel, and/or may result in unsafe operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
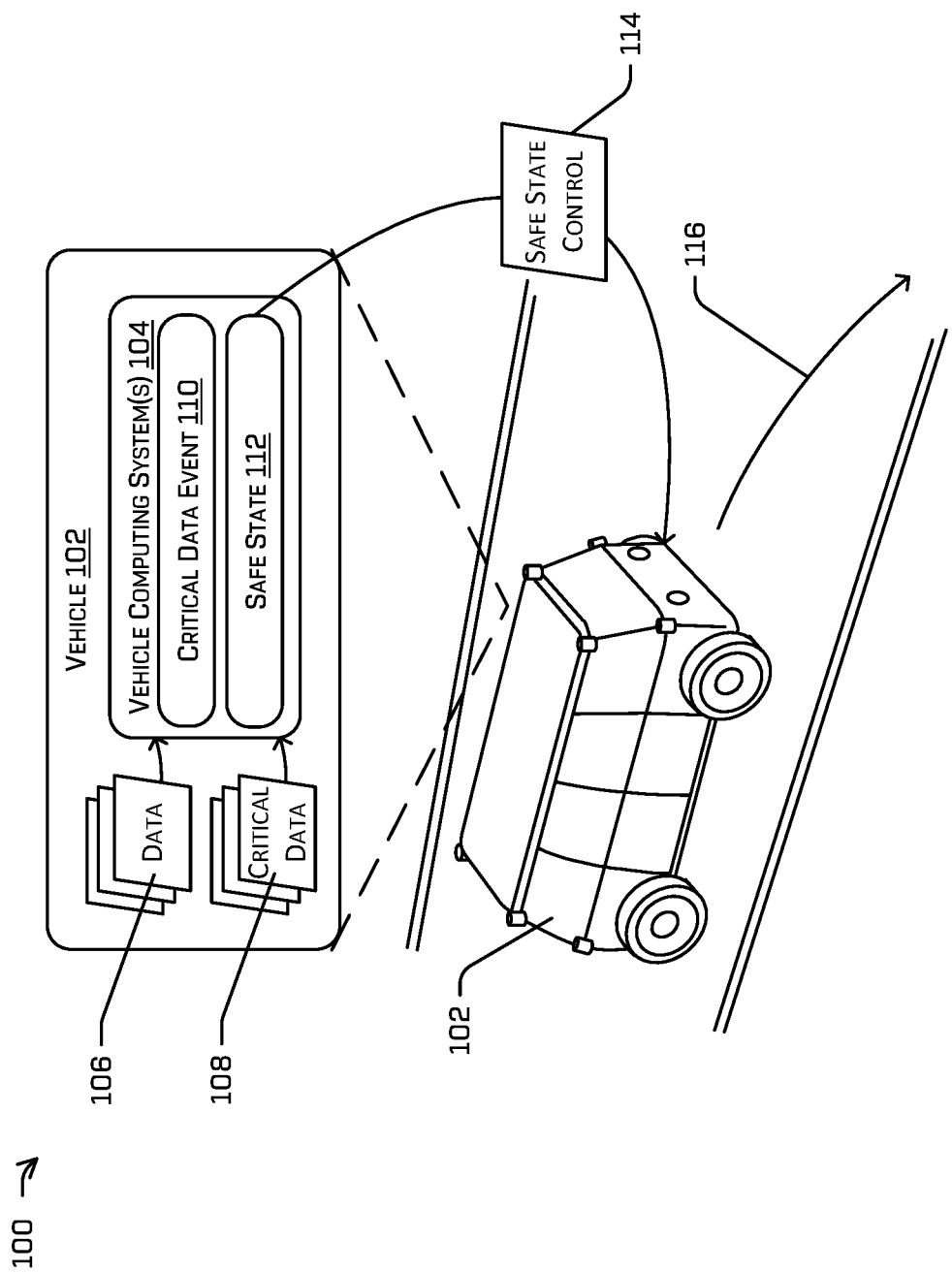
FIG. 1 illustrates an example vehicle, such as an autonomous vehicle, and example components of a system for transitioning the vehicle to a safe state in response to determining an event affecting critical data, as described herein.

This disclosure describes methods, apparatuses, and systems for identifying events associated with critical data received at one or more systems of an autonomous vehicle, and controlling the vehicle relative to those identified events. For example, systems associated with an autonomous vehicle may require certain types of data, e.g., safety critical data, for proper and safe operation. The types of data required may vary by system and can be received from any of a number of sources, including but not limited to sensor systems, perception systems, planning systems, control systems, or the like. Thus, each system may require different data, e.g., from one or more sources. Moreover, each of the systems may generate and provide data, e.g., for use by other systems.

In some implementations described herein, the vehicle may include a communication framework via which each of the systems in the vehicle can be connected. For instance, vehicles implementing the techniques described herein may include a bus, such as a robot operation system (ROS) bus, although other communication protocols and architecture may be used, instead. In the example framework, however, systems connected to the bus may publish information, e.g., as messages associated with topics. Systems can access or otherwise receive the published messages via the bus. For instance, systems may subscribe to one or more topics, e.g., to receive messages (and therefore information about those topics) as they are published.

As described herein, the various systems connected to the bus may subscribe to any topics to receive data. For each subscribing system, or for the system as a whole, however, certain data may be critical data. In some implementations, critical data can be data that a respective system requires to ensure safe operation of the vehicle. Critical data may be specified on a per-system basis.

In some implementations, techniques described herein can determine when critical data is not available to a system. In some examples, data can be published at fixed intervals, e.g., at a predetermined frequency. Accordingly, systems subscribing to receive the data, e.g., as critical data, may expect to receive updated information roughly at the fixed interval. Techniques described herein may monitor received published data at a subscriber and determine an event associated with critical information when a published message is not received within an expected time span. For example, the expected time span can be associated with the frequency at which the data is published. In other implementations, the subscribing system can dynamically determine the time range in which data is expected to be received. For example, the time range can be based on one or more of the speed of the vehicle, an urgency associated with the data, or the like.

Techniques described herein can also, when information is received as expected, determine whether the information is fit for use by the subscribing system. For example, some functionality may require fresh data, and techniques described herein can determine when data is too old. For examples, techniques described herein can compare a first timestamp associated with a time of publication with a second timestamp associated with a time at which information, e.g., a message, is received. Latency may be determined as a difference between the times indicated by the first and second timestamps. Techniques described herein can determine an event associated with the critical information when the determined latency is equal to or above a threshold latency. For example, data that is too old may be unreliable, especially in instances in which there is an expectation that the data will frequently and/or drastically change. In some techniques, an acceptable latency may be dynamically determined. For example, the latency may be based on one or more of a speed of the vehicle, an urgency of the data, or other criteria.

Techniques described herein can also identify other insufficiencies associated with the received data. By way of non-limiting example, some implementations may determine whether the received data is valid. For example, techniques described herein may utilize hashing techniques to validate data received at the subscriber. When the data is not valid, e.g., because a hash value generated at the subscriber is different from a hash value received with the data, techniques described herein can determine the occurrence of an event associated with the data.

In implementations described herein, when an event such as those just described is identified, the vehicle may be controlled in a safe state. For example, the vehicle may be controlled to proceed along a safe stop trajectory, e.g., that brings the vehicle safely to a stop. The vehicle may also be controlled to prohibit additional operation of functions of the vehicle. In other examples, techniques described herein may attempt one or more mitigation strategies, e.g., to attempt to obviate the event without bring the vehicle to a safe stop. Such mitigation strategies may be decreasing network traffic, e.g., on the bus and/or slowing the vehicle.

Techniques described herein may be directed to leveraging data to enable a vehicle, such as an autonomous vehicle, to navigate through an environment while circumventing objects in the environment. Techniques described herein can utilize information about critical data to ensure that systems have the data they need for safe operation, thereby allowing the vehicle to more safely travel through the environment. Moreover, techniques described herein may be faster and/or more robust than conventional techniques, as they may increase the reliability of system functioning. That is, techniques described herein provide a technological improvement over existing navigation technology. Techniques described herein can also provide a smoother ride and improve safety outcomes by, for example, more accurately providing safe passage to an intended destination.

While this disclosure uses an autonomous vehicle in examples, techniques described herein are not limited to application in autonomous vehicles. For example, any systems that require receiving information to perform its functions may benefit from the techniques described. By way of non-limiting example, techniques described herein may be used on airborne and/or ground-borne vehicles, as well as other fully- or partly-autonomous robotic systems. Moreover, non-autonomous vehicles could also benefit from techniques described herein, e.g., for safety in the absence of viable data.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system that relies on critical information to perform functions. This disclosure is not limited to vehicles.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

The example vehicle 102 can be used to travel through an environment and collect data. For example, the vehicle 102 can include one or more sensor systems. The one or more sensors can be, for example, time-of-flight sensors, LIDAR sensors, RADAR sensors, SONAR sensors, image sensors, audio sensors, infrared sensors, location sensors, etc., or any combination thereof. The sensors may be disposed to capture sensor data associated with the environment. In some examples, the sensor data may be processed to identify and/or classify objects in the environment, e.g., trees, vehicles, pedestrians, buildings, road surfaces, signage, barriers, road marking, or the like.

As also illustrated in FIG. 1, the vehicle 102 can include one or more vehicle computing systems 104. Examples of the computing system(s) 104 can include one or more of a localization system, a perception system, a planning system, a system controller, a controller, a mapping system, or the like. These and other examples systems are detailed further herein, including with reference to FIG. 3. In other examples, the computing system(s) 104 can also or alternatively include a system communicating with the vehicle 102, e.g., via a wired or wireless connection.

As detailed above, the vehicle computing system(s) 104 may be configured to perform one or more functions, and may rely on data to perform those functions. For instance, as illustrated in FIG. 1, the vehicle computing system(s) 104 may be configured to receive various types of data 106 and critical data 108. The data 106 may generally include any data or type of data that the vehicle computing system(s) 104 can use to perform its respective functions. The critical data 108 may be a subset of the data 106 and may include safety critical information, e.g., information that may be necessary to ensure that the vehicle 102 can operate safely. Thus, in some instances, critical data 108 may be data that is essential for safe operation of the vehicle 102. Consider an example in which the vehicle computing system(s) 104 includes a planner system configured to plan a route and/or trajectory for the vehicle 102 to travel through the environment 100. For instance, the planning system may receive and consider data about objects in the environment 100, e.g., to navigate relative to those objects. Information about objects in the environment 100 may be critical data 108, e.g., because it is essential for prolonged navigation of the vehicle 102 throughout the environment 100 and without incident. The planning system may also receive and consider additional, less- or non-critical information. For example, the planning system may also receive data about user preferences. The planning system may use the user preference information to navigate the vehicle in accordance with a user's preference. The user preference information, while constituting data 106, may not be safety-critical. By way of example, whether the user prefers certain driving characteristics, such as relatively sharper turns and/or quicker acceleration, may not be essential for safe operation of the vehicle 102. Of course, the planning system is but one example of the vehicle computing system(s) 104 and the critical and non/critical data types are only examples.

As will be appreciated, what data is critical for functioning may vary from system to system. Moreover, while aspects of this disclosure use "critical" to refer to data that is safety-critical, or the like, other parameters may be used. For example, while the example above describes the user preference information as non-critical to the functioning of the planner system, in other implementations and/or for different systems, that data may be critical.

Regardless of what data is identified as critical, receipt of the data may be required to perform one or more functions at the computing system(s) 104. Moreover, the received data must be suitable for use by the system(s) 104. As illustrated, the computing system(s) 104 can include a critical data event component 110. The critical data event component 110 can determine events associated with the critical data 108, including whether the critical data 108 is received or whether received data is timely, valid, and/or otherwise acceptable for use. Examples of functioning of the critical data event component 110 are described further herein, including with reference to FIGS. 2A and 2B. In those examples, an event may be determined when data is not received as expected and when received data is too old, respectively.

The vehicle computing system(s) 104 may also include a safe state component 112. For example, the safe state component may receive event information from the critical data event component 110 and institute one or more operations in response to the event. In the illustrated example, the safe state component 112 may issue a safe state control 114 that controls the vehicle 102 to execute a safe stop maneuver. For example, the safe stop maneuver may include controlling the vehicle 102 to follow a trajectory 116, e.g., safe trajectory along which the vehicle 102 can safely navigate to the side of the road. Once on the side of the road, the vehicle 102 may be placed in a safety state, e.g., in which some or all functionality is disabled. For instance, the vehicle may be controlled to remain in a parked state, in which travelling is prohibited. The vehicle 102 may remain in this state until further diagnostics or the like are carried out.

The safe state control 114 that causes the vehicle 102 to follow the trajectory 116 is only one example of a safe state control. In other examples, instead of bringing the vehicle 102 to a complete stop, the safe state component 112 may control the vehicle 102 to slow down. For example, travelling at a lower speed may be more tolerant of events and/or may have different associated thresholds that will cause the critical data event component 110 to determine the existence of an event. In other examples, the safe state component 112 may configure the vehicle to pause and/or stop transmission of non-critical data. For instance, critical data-related events may be more prevalent in instances in which communication systems, e.g., a bus, on the vehicle are more heavily used. These and other safe state controls are described further herein.

Thus, techniques described herein can identify, on a system-by-system basis, which data is critical to functioning of that system 104 and/or the vehicle 102. Techniques can also determine whether events associated with receipt of the critical data have occurred, and can take action to operate the vehicle 102 safely in light of such events.

Figure 2A:
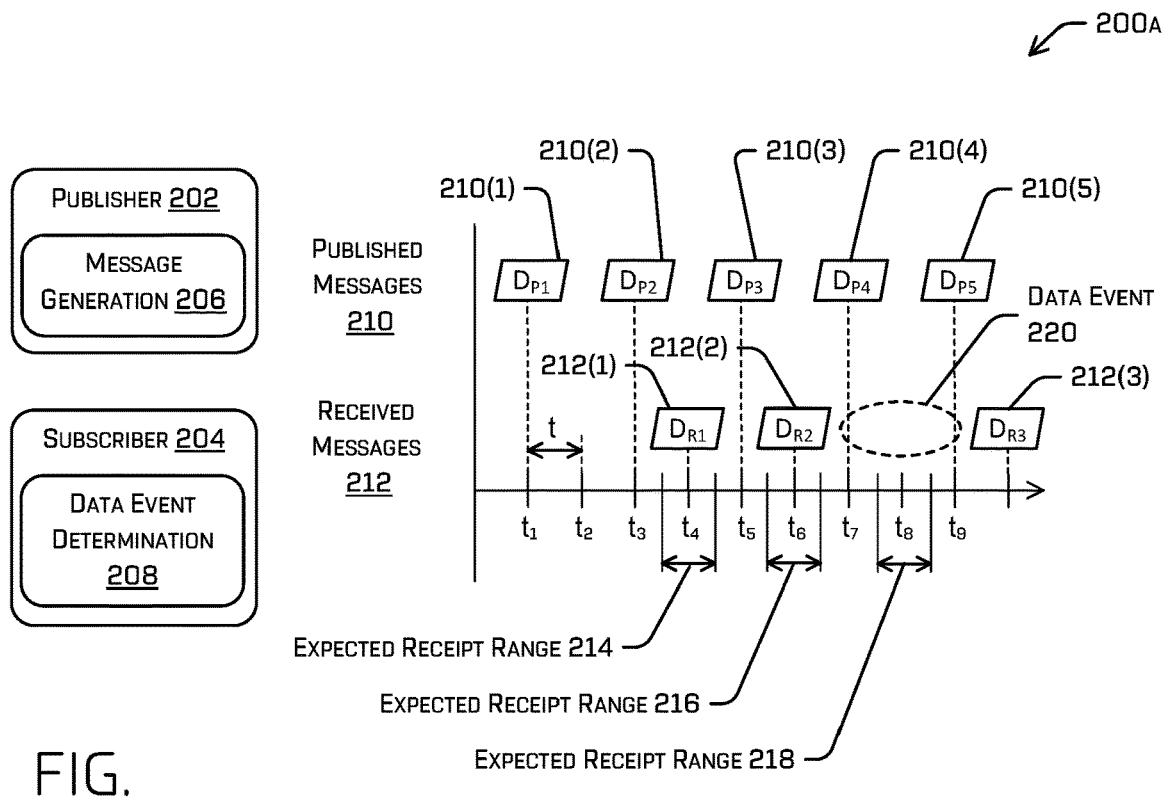
FIGS. 2A and 2B illustrate example scenarios of detecting critical data events, as described herein.
Figure 2B:
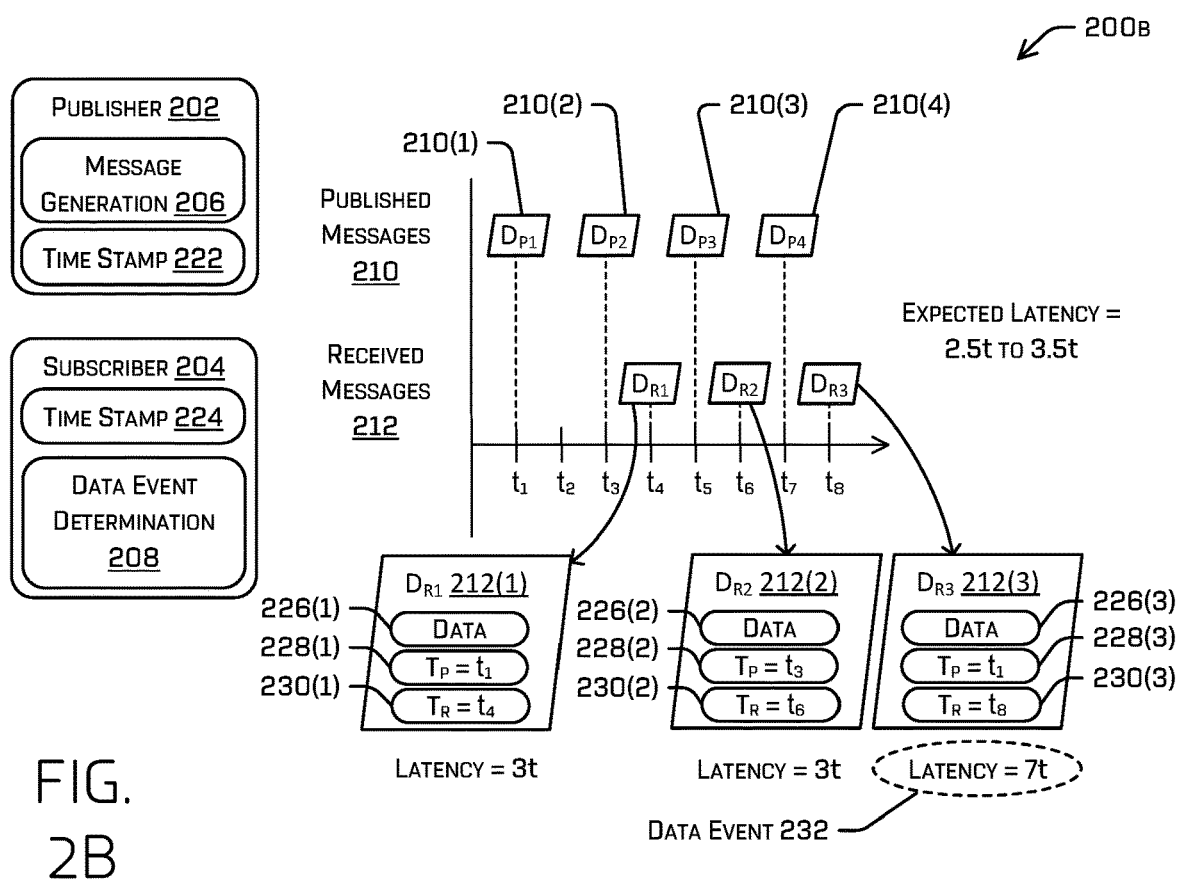

FIGS. 2A and 2B schematically illustrate examples of events associated with receipt of critical data according to implementations of this disclosure. For example, the events illustrated in FIGS. 2A and 2B may cause the vehicle 102 to be operated in a safe state. More specifically, FIG. 2A illustrates a first example 200a, in which critical data is not received as expected, and FIG. 2B illustrates a second example 200b, in which received critical data is unreliable, because it has aged beyond a threshold latency. The two examples will be described in order, below.

The first example 200a, illustrated in FIG. 2A, generally includes a publisher 202, which is a system or system component configured to publish (e.g., output) data, and a subscriber 204, which is a system or system component configured to receive data, including data published by the publisher 202. In the example of FIG. 1, the publisher 202 and the subscriber 204 may be two different vehicle computing systems 104. In other examples, however, one or both of the publisher 202 and the subscriber 204 may be separate from the vehicle 102. Although this example is described generally in the context of a publication/subscription framework, other communication architectures and protocols may be used.

The publisher 202 generally includes a message generation component 206 which generally designates any function or system that generates data and/or outputs data for publication by the publisher 202, and the subscriber 204 generally includes a data event determination component 208. In the example of FIG. 2A, the data event determination component 208 is configured to determine whether data that is expected to be received by the subscriber 204 is, in fact, received.

The example 200a includes a timeline that generally illustrates the publication of messages, e.g., as published messages 210, by the publisher 202. Although messages are used in the examples herein, other data formats may be used in lieu of messages. In the illustrated example, the publisher 202 is configured to publish the published messages 210 at a predetermined frequency. In some examples, the frequency may be based on functionality of the system comprising the publisher 202. By way of non-limiting example, when the publisher 202 is associated with a perception system that generates and outputs information about representations, e.g., bounding boxes, of objects in the environment, the perception system may be configured to publish the generated information at a predetermined frequency. That frequency may be reliant upon receiving sensor data about the environment, and thus the perception system may publish perception data at a lower frequency than sensors will publish sensor data. Similarly, systems that require the perception data, e.g., a planning system that determines trajectories to navigate relative to the perceived objects, may publish data less frequently than the perception system will publish perception data. In examples described herein, depending upon the publisher 202 and/or the data to be published, the publisher 202 can publish information on the order from about 1000 Hz to about 1 Hz or more. Returning to the specific example of FIG. 2A, the publisher 202 publishes messages 210 at a frequency of 0.5 t, e.g., at a period 2 t. In the example, at time $t_1$ the publisher 202 publishes a first message 210(1), at time $T_3$ the publisher 202 publishes a second message 210(2), at time $T_5$ the publisher 202 publishes a third message 210(3), and so forth.

The timeline also illustrates the receipt of messages, e.g., as received messages 212, at the subscriber 204. In the example, the subscriber 204 may be aware that the publisher 202 publishes the messages 210 every 2 t, and thus may expect to receive the published data at that period. More specifically, assuming a consistent latency between publication and reception, the subscriber 204 can expect to receive the received critical data at the same period 2 t, delayed by some latency. For a variety of factors, including but not limited to, factors associated with the network via which the published messages 210 are received, actual expected receipt time may vary. Thus, each instance of the received messages 212 may be expected with a range of time about the period. With specific reference to FIG. 2A, the subscriber 204 may know that the published messages may take about 3 t to be received, and thus the subscriber may expect the first published message 210(1) to be received at approximately $t_4$ and subsequent messages at intervals of 2 t thereafter. FIG. 2A illustrates the expected receipt time as an expected receipt range, e.g., comprising a variance from the expected receipt time. Specifically, 214 designates a range of time in which the subscriber expects to receive a first received message 212(1), which may correspond to the first published message 210(1). Similarly, 216 designates a range in which the subscriber 204 expects to receive a second received message 212(2), which may correspond to the second published message 210(2), and 218 designates a range in which the subscriber 204 expects to receive a third received message 212(3), which may correspond to the third published message 210(3).

In the example 200a, the first received message 212(1) is received in the first expected range 214 and the second received message 212(2) is received in the second range 216. However, the subscriber 204 fails to receive information in the third expected range 218. As illustrated, the subscriber 204 may subsequently receive a third message 212(3), but no message was received in the range 218. Accordingly, the data event determination component 208 may determine the occurrence of a data event 220, e.g., a critical data event associated with the critical data contained in the messages 210, 212 not being received. As noted above in the discussion of FIG. 1, and as described further herein, the data event 220 may result in the safe state component 112 issuing a safe state control 114. In some examples, the vehicle 102 may execute the safety control 114 by traversing along, e.g., coming to stop in accordance with, the trajectory 116.

FIG. 2B illustrates the second example 200b, in which a critical data event is determined based at least in part on received data being too old. More specifically, FIG. 2B includes the publisher 200 and the subscriber 204. The publisher 202 includes the message generation component 206 and publishes the messages 210 at regular intervals, as in the example of FIG. 2A. The subscriber 204 also includes the data event determination component 208. As noted, however, in the example 200b the data event determination component 208 is configured to determine events associated with data latency, e.g., so the vehicle can be operated in a safe state when received data is old. For example, old data may be received when there is an unexpected delay, when the publisher 202 is experiencing errors, or in other circumstances. In some examples, critical data that is too old may be unsuitable for safe operation of the vehicle. In the example 200b, the subscriber 204 may deem data usable only when it is associated with a latency within an expected latency range and/or below a threshold latency. In the example provided in FIG. 2B, the publisher 202 publishes the messages 210 at an interval of 2 t, as in the example 200a. As also illustrated, in this example, an expected latency associated with the transmission of the published messages may be about 3 t. Thus, in the illustrated example, the example 200b requires that the latency of received messages from the publisher 202 must be within a range of from about 2.5 t to about 3.5 t to be deemed acceptable for use by the system associated with the subscriber. Note that the acceptable latency may be a range, instead of a finite time, e.g., to account for variation in the publisher 202 and/or the communication system, including but not limited to network traffic and other system demands. Moreover, the latency range may vary based on other parameters. By way of non-limiting example, when the frequency at which the published messages 210 are published is relatively low, a relatively larger latency range may be acceptable. Conversely, when the frequency at which the published messages is relatively high, a relatively smaller latency range may be acceptable.

As also illustrated in FIG. 2B, the publisher 202 includes a timestamp component 222. In implementations described herein, the timestamp component 222 may generate a timestamp at the time of publication of the message 210. Thus, in the example, the first published message 210(1) may include a timestamp corresponding to the time $T_1$, the second published message 210(2) may include a timestamp corresponding to the time $T_3$, and so forth. Similarly, and as also illustrated in FIG. 2B, the subscriber 204 can include a timestamp component 224. The timestamp component 224 may be configured to generate a timestamp upon receipt of the messages.

FIG. 2B also illustrates the three instances of the received messages 212 in more detail. Specifically, the first received message 212(1) includes data 226(1), e.g., critical data for the subscriber 204, a first timestamp 228(1), and a second timestamp 230(1). Similarly, the second received message 212(2) includes a representation of the data 226(2), a first timestamp 228(2), and a second timestamp 230(2). Finally, the third received message 212(3) includes critical data 226(3), a first timestamp 228(3), and a second timestamp 230(3). In some implementations, the first received message 212(1), the second received message 212(2) and the third received message 212(3) may each constitute a message that includes the data 226, the first timestamp 228, and the second timestamp 230. Although omitted for clarity, the messages may include data and/or information in addition to the data 226, the first timestamp 228, and the second timestamp 230. For example, the messages 212 may include headers, tags, hash values, or the like.

In the second example 200b, the first timestamps 228 and the second timestamp 230 may be used to determine whether a particular message complies with an expected latency. More specifically, in the example, the received critical data is expected at a latency between about 2.5 t and about 3.5 t, relative to publication. As noted above, the expected latency may be 3 t, although because of various factors, including network traffic, or the like, the latency may vary slightly from the expected, and thus the range is used. In some implementations, the variance from the expected latency may depend upon many factors, including but not limited to the frequency at which the messages 210 are published, the criticality of the information to the subscriber 204, and or the like. Returning again to the example instances of the received messages 212, the first timestamp 228(1) of the first received message 212(1) indicates that the data 226(1) is published at a time Ti and the second timestamp 230(1) indicates that the data message 212(1) was received at time $T_4$. Thus, the message 212(1) has a latency of 3 t. Because 3 t is in the expected range of 0.5 t to 3.5 t the data 226(1) is validated. Similarly, by comparing the timestamps 228(2) and 230(2), it may be determined that the second received message 212(2) is also valid. However, the third received message 212(3) has a first timestamp indicating that the data 226(3) was published at time $t_1$. Because the third message 212(3) was received at time $t_8$, as indicated by the second timestamp 230(3), the third message 212(3) has an associated latency of 7 t, which longer than allowed. Thus, the data event determination component 208 can determine a data event 232 associated with the received third message 212(3). For example, the message 212(3) could be a re-publication of the first message 210(1). As with the example 200a, discussed above, the critical data event 232 may result in the safe state component 112 issuing a safe state control 114. In some examples, the vehicle 102 may execute the safety control 114 by traversing along and/or coming to a stop in accordance with the trajectory 116.

Accordingly, FIGS. 2A and 2B illustrate two examples for determining critical data events. As discussed, in response to the data events, the vehicle 102 may controlled in accordance with a safe state. In other implementations, other processes also may be used to determine whether critical data is suitable for use by a subscriber 204. By way of non-limiting example, received data, such as the received messages 212, may be validated. For instance, the messages 212 may be checked for missing bits, fields, headers, checksums, or the like.

Figure 3:
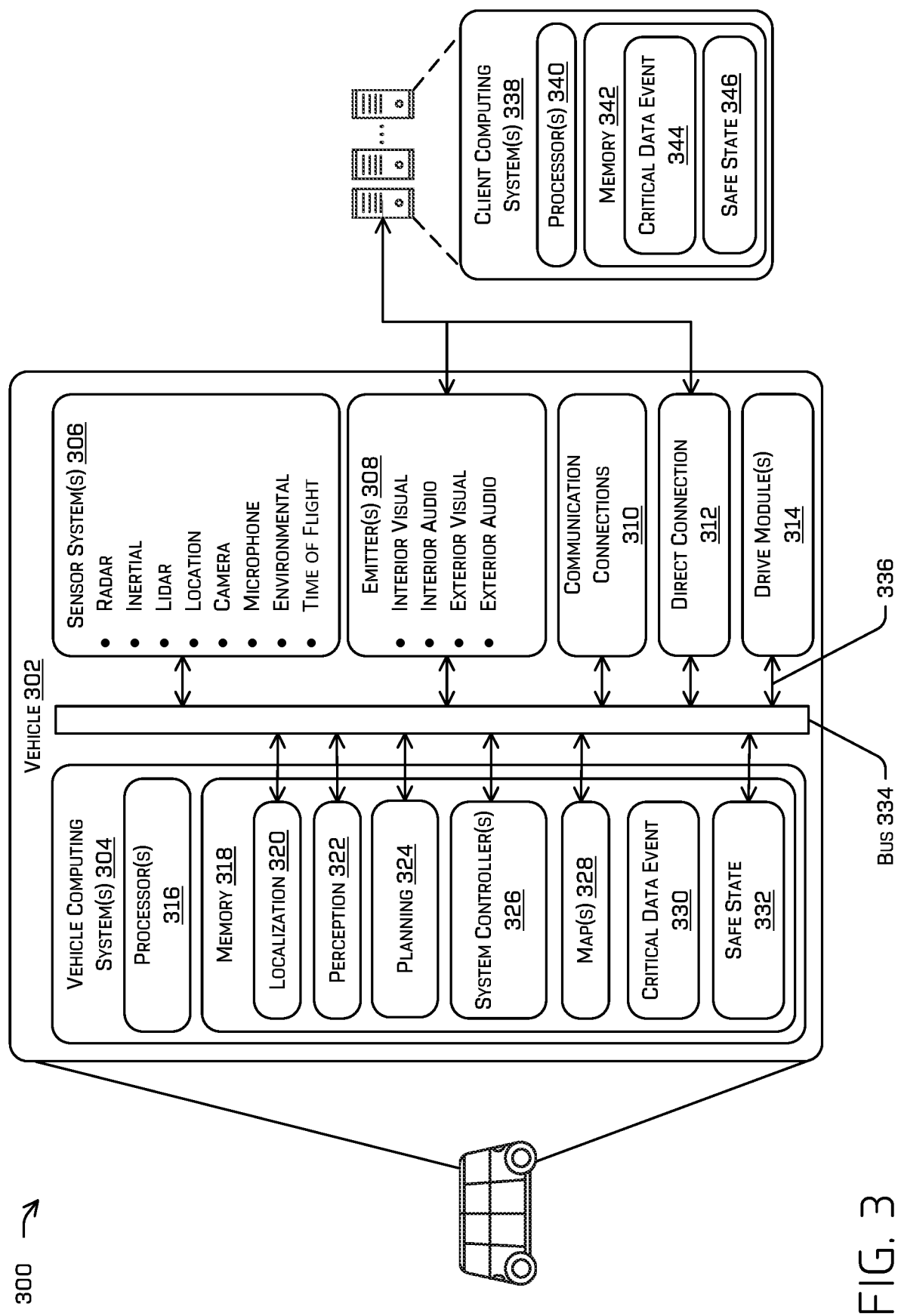
FIG. 3 depicts a block diagram of an example architecture for implementing safe state operation techniques, as described herein.

FIG. 3 depicts a block diagram of an example architecture 300 for implementing the techniques discussed herein. In at least one example, the architecture 300 can include a vehicle 302, which can be similar to (or the same as) the vehicle 102 described above with reference to FIG. 1. In the illustrated architecture 300, the vehicle 302 is an autonomous vehicle; however, the vehicle 302 can be any other type of vehicle.

The vehicle 302 can include one or more vehicle computing systems 304, one or more sensor systems 306, one or more emitters 308, one or more communication connections 310, at least one direct connection 312 (e.g., for physically coupling with the vehicle 302 to exchange data and/or to provide power), and one or more drive modules 314. In some instances, the vehicle 302 can include more or fewer instances of the vehicle computing system(s) 304. The sensor system(s) 306 can be configured to capture sensor data associated with an environment.

The vehicle computing system(s) 304 can include one or more processors 316 and memory 318 communicatively coupled with the one or more processor(s) 316. In the illustrated example, the memory 318 of the vehicle computing system(s) 304 stores a localization system 320, a perception system 322, a planning system 324, one or more system controller(s) 326, one or more maps 328, a critical data event component 330, which may be the same as the critical data event component 110 and/or the data event determination component 208, and a safe state component 332, which may be the same as the safe state component 112. Though depicted as residing in the memory 318 for illustrative purposes, it is contemplated that the localization system 320, the perception system 322, the planning system 324, the one or more system controllers 326, the map(s) 328, the critical data event component 330, and/or the safe state component 332 can additionally, or alternatively, be accessible to the computing system(s) 304 (e.g., stored in a different component of vehicle 302 and/or be accessible to the vehicle 302 (e.g., stored remotely)). Moreover, although certain features and functionality may be ascribed to various systems and components, such is for example only. The features and functions may be associated with and/or performed by other or additional components. Moreover, some functionality ascribed to a specific system or component may be distributed across multiple systems/components.

In at least one example, the localization system 320 can include functionality to receive data from the sensor system(s) 306 to determine a position of the vehicle 302. In some implementations, the localization system 320 can include and/or request/receive a three-dimensional map, e.g., of the map(s) 328, of an environment and can continuously determine a location of the autonomous vehicle within the map. In some instances, the localization system 320 can use SLAM (simultaneous localization and mapping) or CLAMS (calibration, localization and mapping, simultaneously) to receive image data, such as from the time-of-flight sensor, LIDAR data, RADAR data, SONAR data, IMU data, GPS data, wheel encoder data, or any combination thereof, and the like to accurately determine a location of the autonomous vehicle 302. In some instances, the localization system 320 can provide data, e.g., by publishing data according to techniques described herein, to various components of the vehicle 302 to determine an initial position of an autonomous vehicle for generating a candidate trajectory, as discussed herein.

In some examples, the perception system 322 can include functionality to perform object detection, segmentation, and/or classification. For instance, the perception system 322 can provide processed sensor data that indicates a presence of an entity that is proximate to the vehicle 302 and/or a classification of the entity as an entity type (e.g., car, pedestrian, cyclist, building, tree, road surface, curb, sidewalk, unknown, etc.). In additional and/or alternative examples, the perception system 322 can provide, e.g., by publishing, processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning system 324 can determine a path for the vehicle 302 to follow to traverse through an environment. For example, the planning system 324 can determine various routes and trajectories and various levels of detail. For example, the planning system 324 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning system 324 can generate an instruction for guiding the autonomous vehicle along at least a portion of the route from the first location to the second location. In at least one example, the planning system 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning system 324 can alternatively, or additionally, use data from the perception system 322, e.g., received via subscription, to determine a path for the vehicle 302 to follow to traverse through an environment. For example, the planning system 324 can receive data from the perception system 322 regarding objects associated with an environment. Using this data, the planning system 324 can determine a route to travel from a first location (e.g., a current location) to a second location (e.g., a target location) to avoid objects in an environment.

In at least one example, the vehicle computing system(s) 304 can include one or more system controller(s) 326, which can be configured to control steering, propulsion, braking, safety, emitters, communication, and other systems of the vehicle 302. The system controller(s) 326 can communicate with and/or control corresponding systems of the drive module(s) 314 and/or other components of the vehicle 302, which may be configured to operate in accordance with a trajectory provided from the planning system 324. In techniques described herein, the system controller(s) 326 can subscribe to receive information about a trajectory along which the vehicle 302 can travel, e.g., published by the planning system 324.

In some examples, the one or more maps 328 can be stored on a remote computing device. In some examples, multiple maps 328 can be stored based on, for example, a characteristic (e.g., type of entity, time of day, day of week, season of the year, etc.). Storing multiple maps 328 can have similar memory requirements, but increase the speed at which data in a map can be accessed. In at least some examples the map(s) 328 and/or information related to the map(s) 328 can be published in accordance with implementations described herein. For instance, the vehicle computing system(s) 304 or some other system can publish information about a network of roads at least partly informed by the map(s) 328.

The critical data event component 330 can be configured to determine critical events associated with the receipt of critical information at various systems and/or components. For example, the critical data event component 330 can be associated with each system or component of the architecture 300 that requires critical data to perform functions. Although the critical data event component 330 is illustrated as a single block in the memory 318, one or more separate critical data event component(s) 330 can be included in or accessible to each system. By way of non-limiting example, the localization system 320 may have one or more dedicated critical data event components, the perception system 322 may have one or more dedicated critical data event components, the planning system may have one or more critical data event components, and so forth.

In some implementations, the critical data event component 330 can identify critical data for a system and/or store one or more parameters associated with receipt of such data. As described herein, different systems may require different data, and only some of that data may be critical, e.g., critical to safe functioning. The critical data event component 330 can identify such information as critical information and monitor received messages and/or data related to that information. In some examples, as in FIG. 2A described above, a system may expect to receive one type of critical data in a predetermined window of time. The critical data event component 330 can monitor receipt of that type of data and confirm that is received within the window. When the information is not received in the window, the critical data event component 330 may recognize an event. Moreover, and as described herein, the critical data event component may determine different criticality thresholds for different types of data and/or for data at different systems. For example, data that is critical for two subsystems may have a first time range for the first subsystem and a second time range for the second subsystem. Similarly, different data may have the same or different associated time ranges.

In other implementations, the critical data event component 330 can inspect timestamps associated with the publication and receipt of messages, e.g., to confirm that the data in the message is suitable for use. For instance, and as described above in connection with FIG. 2B, the critical data event component 330 can compare a timestamp associated with a publication time of a message containing the critical data, to a timestamp associated with a receipt time of a corresponding message. In this example, the difference in time between the timestamps is indicative of a latency, and if the latency is outside of a predetermined threshold the critical data event component 330 may recognize an event. Specifically, in this example, the received data may be too old to be trusted.

In some instances, the critical data event component 330 may also be used to determine time thresholds, e.g., an expected time window in which data is expected to be received and/or a latency range/threshold associated with received data. In some examples, the critical data event component 330 may store one or both of these time ranges for each type of critical data, e.g., they may be predetermined based at least in part on the type of data, the criticality of the data, or the like. In other embodiments, however, the critical data event component 330 can determine one or more of the time ranges, e.g., dynamically, based on one or more parameters associated with the vehicle. By way of non-limiting example, the critical data event component 330 can determine an acceptable latency to be relatively higher and/or a time window to receive data to be relatively wider when the vehicle 302 is travelling more slowly, when there are fewer objects in the environment of the vehicle, and/or the like.

In one example, the critical data event component may receive information from the perception system 322. As described above, the perception system 322 can determine information about objects in the environment of the vehicle, e.g., the position, pose, movement, and/or extent of the objects. In some examples, based on the objects, perimeters of a road or lane relative to the vehicle, the critical data event component may determine a time to stop safely stop the vehicle or take some other action relative to those objects, and the acceptable latency for critical data and/or acceptable time window during which critical data can be received may be determined based at least in part on this stopping time. In some examples, the time for the vehicle to come to a stop relative to the object (and/or lane/road boundary) may be determined using equation (1):

$$t = \frac{-V \pm \sqrt{v^2 + 2ad}}{a} \quad (1)$$

More specifically, in Equation (1), t is the time for the vehicle to stop relative to the object, v is an initial velocity of the vehicle relative to the object, d is a distance to the object or boundary, and a is a maximum deceleration of the vehicle. In some cases, the equation above may be altered based on relative velocities and accelerations when taking a detected or predicted trajectory of the object into account (e.g., v would represent the velocity of the vehicle relative to the object). In some examples, the critical data event component 330 can determine the time to stop for a closest object or the critical data event component 330 can determine a time to stop for each object in the environment. In the latter example, the object associated with the shortest time to stop may be used to determine threshold for receiving data. In some examples, objects in the environment may include any object to which the vehicle may have to react, including but not limited to road signs, other vehicles, obstructions, pedestrians and/or other static or dynamic objects. Moreover, although this example generally describes stopping relative to the object, in other implementations, the time to execute a safe state control may instead by considered, e.g., to reduce a velocity, but not to a stop. In such cases, the equation described above may be altered to reflect an initial and desired velocity, a distance in which to achieve the desired velocity, and the like.

In examples of this disclosure, the time to stop (or otherwise effectuate a safe state) may be one factor used to determine an acceptable latency of data and/or an acceptable time frame for receiving data. For instance, a processing time, e.g., of the system receiving the data, and/or of downstream systems may also be considered along with the time to execute the stop/safe state. Stated differently, while the equation (1) may be used to determine a time to stop relative to an object, the vehicle must undergo certain processes before it has the information to determine the time to stop. Thus, for example, the critical data event component 330 can also consider processing capabilities of the system and/or other factors that must take place at the vehicle to begin the safe process. In some examples, the processing time may be determined as an expected latency of vehicle and/or one or more subsystems of the vehicle, which may include expected latency distributions. For a particular component (subsystem), the processing time may be determined from the component to a final component (e.g., a last component downstream of the component) which depends directly or indirectly from the component. For example, the latency (processing time) can be determined according to techniques described in U.S. patent application Ser. No. 16/225,997, titled "Safe System Operation Using Latency Determinations," filed Dec. 19, 2018, the entirety of which is hereby incorporated by reference.

In some examples, the critical data event component 330 can determine a time that a component needs to react (e.g., a reaction time), as well as a time to execute the reaction (e.g., an execution time). As discussed above, the execution time may be based, for example, on the velocity of the vehicle, the vehicle's position relative to an object (e.g., the closest object to the vehicle and/or the object most likely to interfere with travel of the vehicle), capabilities of the vehicle, and/or the like. As also discussed above, the reaction time may be based, for example, on a time it takes to determine to execute the reaction. In the context of an autonomous vehicle, the reaction time may be associated with expected processing. Based on the reaction time, the execution time, and/or the time to stop safely, the critical data event 300 can also determine a tolerable latency for receiving data and/or a time period during which data must be received to ensure safe operation of the vehicle. As a non-limiting example, the critical data event component 330 may determine that a nearest obstacle (object or boundary) would require 100 ms to come to a full stop at maximum deceleration and that to engage such braking would also require 50 ms. Latency for a perception component to the end of the system (e.g., all connected components downstream of the perception component) may be determined to be approximately 20 ms. As such, the critical data event component 330 may determine that incoming messages to the perception component will only be tolerated with a latency of less than or equal to 170 ms. In a worst case scenario, data sent to the perception component will take 20 ms to finally output control data, 50 ms will transpire to engage maximum braking, and 100 ms will transpire upon braking before hitting the object.

In further implementations, the critical data event component 330 can recognize different types of events. For instance, the critical data event component 330 can identify corrupted or invalid data. For example, the critical data event component 330 can ensure that headers have not been dropped from received messages or altered, that the timestamps are present in the received messages, or the like. In other implementations, the critical data event component 330 can also perform data integrity checks, e.g., to ensure that the received data corresponds to the published data. For instance, the critical data event component 330 can compare hashes associated with the data to determine that received data is valid data. For example, a first hash value may be published with the critical data, and the critical data event component 330 may use a hash function to generate a second hash value. When the first hash value and the second hash value are the same, the received information may be validated. For example, a cyclic redundancy check (CRC) hash function may be used to generate a checksum as the hash function.

The safe state component 332 can determine and output one or more actions in response to the critical data event component 330 determining presence of an event. For example, the safe state component 332 may initiate a safe stop of the vehicle. In some implementations, the planning system 324 may generate a safe trajectory as a fallback trajectory, e.g., in addition to a normal driving trajectory. Thus, when the critical data event component 330 determines that critical information is not available, the safe state component 332 can cause the vehicle to execute this safe stop trajectory. In other implementations, the safe state component 332 can execute a strategy that disables certain functions of the vehicle 302, e.g., to prevent the vehicle from moving once brought to stop.

In some examples, the safe state component 332 can determine actions different from those requiring the vehicle to come to a stop. For example, the safe state component 332 can undertake one or more mitigation strategies to mitigate the data event. In some examples such mitigation strategies can include creating an alert to a passenger, to a remote operator, or other entity. For example, the alert may request assistance from the entity. In other implementations, the safe state component 332 can take actions to reconfigure systems and/or settings of the vehicle 302. For example, the safe state component 332 may prevent certain data from being received and/or published, e.g., in an attempt to reduce network traffic. For example, excessive network traffic may be a common cause of unreceived data and/or excessive latency. Other mitigation strategies may include reducing the speed of the vehicle, restarting components or subcomponents, selecting different pathways for data in a network topology, using different communication protocol, selecting different sensor modalities, using backup systems, or otherwise. For example, because the thresholds associated with receiving data and/or latency may be safety-related, the vehicle may be able to maintain safe operation with less critical data at slower speeds. Thus, for example, the periodicity at which critical data is to be received may be extended when the vehicle is moving more slowly and/or a greater latency may be tolerable. Similarly, an acceptable latency may be longer when the vehicle is travelling more slowly.

In at least one example, the sensor system(s) 306 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, the time-of-flight sensors can include individual time-of-flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the computing system(s) 304, e.g., by publishing sensor data in accordance with examples described herein.

The vehicle 302 can also include one or more emitter(s) 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 302 can also include the one or more communication connection(s) 310, which may enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 can also enable the vehicle 302 to communicate with a remote teleoperations computing device or other remote services.

The communications connection(s) 310 can include physical and/or logical interfaces for connecting the computing system(s) 304 to another computing device or an external network (e.g., the Internet). For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

As noted above, the direction connection 312 can physically couple devices to the vehicle 302, e.g., to exchange data and/or to provide power. In the illustrated example, the direct election may provide a point of access to one or more client computing systems 238, described in more detail below.

The vehicle 302 can also include the drive module(s) 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

As also illustrated in FIG. 3, the vehicle 302 can also include a bus 334 via which each of the components and systems of the vehicle 302 may communicate information. The bus 334 may generally represents a component via which the components send and/or receive data. In at least one example, the bus 334 can a bus to which publishers can publish information, and via which subscribers can receive information. Arrows 336 in FIG. 3 may show directionality of data relative to the bus 334. Thus, by way of nonlimiting example, the safe state component 332 can publish data, e.g., a safe stop message, to the bus 334, and the drive module(s) 314, which may subscribe to receive safe stop messages, can receive the published message, and implement the safe stop. In another example, the localization system 320 can publish pose information, and the planning system 324 can receive the pose information to determine a trajectory along which the vehicle should be controlled. As will be appreciated, the various systems and components can publish information to the bus 334 and/or receive information from the bus, e.g. by subscribing to a topic or type of information. Although a publication/subscription scheme, via the bus 334, is illustrated in FIG. 3, other communication architectures may also or alternatively be used.

As noted above, FIG. 3 also illustrates the remote computing system(s) 338. For example, the remote computing system(s) 338 may be one or more client devices in communication with the vehicle 302. In the illustrated example, the computing system 338 may be directly connected to the vehicle 302, e.g., via the direct connection 312. Accordingly, the computing system 338 also has access to the bus 334, and therefore can publish and/or receive information for use by other systems. In one example implementation, the computing system 338 may be associated with a safety driver in the vehicle. In this implementation, the computing system 338 may include a display (not shown) via which the safety operator can be provided with a visualization of what the vehicle 302 is seeing the environment. However, other additional computing systems 338 also are contemplated.

The computing system(s) 338 can include processor(s) 340 and memory 342 communicatively coupled with the processor(s) 340. In the illustrated example, the memory 342 of the computing device(s) 338 stores a critical data event component 344 and safe state component 346. In at least one example, the critical data event component 344 can correspond to at least a portion of the critical data event component 330. For example, the critical data event component 344 may determine events associated with critical information to which the computing system 338 subscribes. Moreover, the safe state component 346 can correspond to at least a portion of the safe state component 332. For example, the safe state component 346 may issue controls to operate the vehicle 302 in a safe mode when the critical data event component 344 detects an event. In the example above in which the computing system(s) 338 are associated with a safety driver ensuring proper operation of the vehicle, when the critical data event component 344 determines that critical data, such as perception data published by the perception system 322 or trajectory data published by the planning system 324 is not received as expected, is aged, invalid or otherwise lacks integrity, the safe state component 346 can publish a safe stop command, e.g., to the bus 334, via the direct connection 312.

The processor(s) 316 of the vehicle 302, and the processor(s) 340 of the computing system(s) 338 can be any suitable processor capable of executing instructions to process data and perform operations as described herein. By way of example and not limitation, the processor(s) 316, 340 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318, 342 are examples of non-transitory computer-readable media. The memory 318, 342 can store an operating system and one or more software applications, instructions, programs, and/or data to implement the methods described herein and the functions attributed to the various systems. In various implementations, the memory 318, 342 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 318, 342 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

Figure 4:
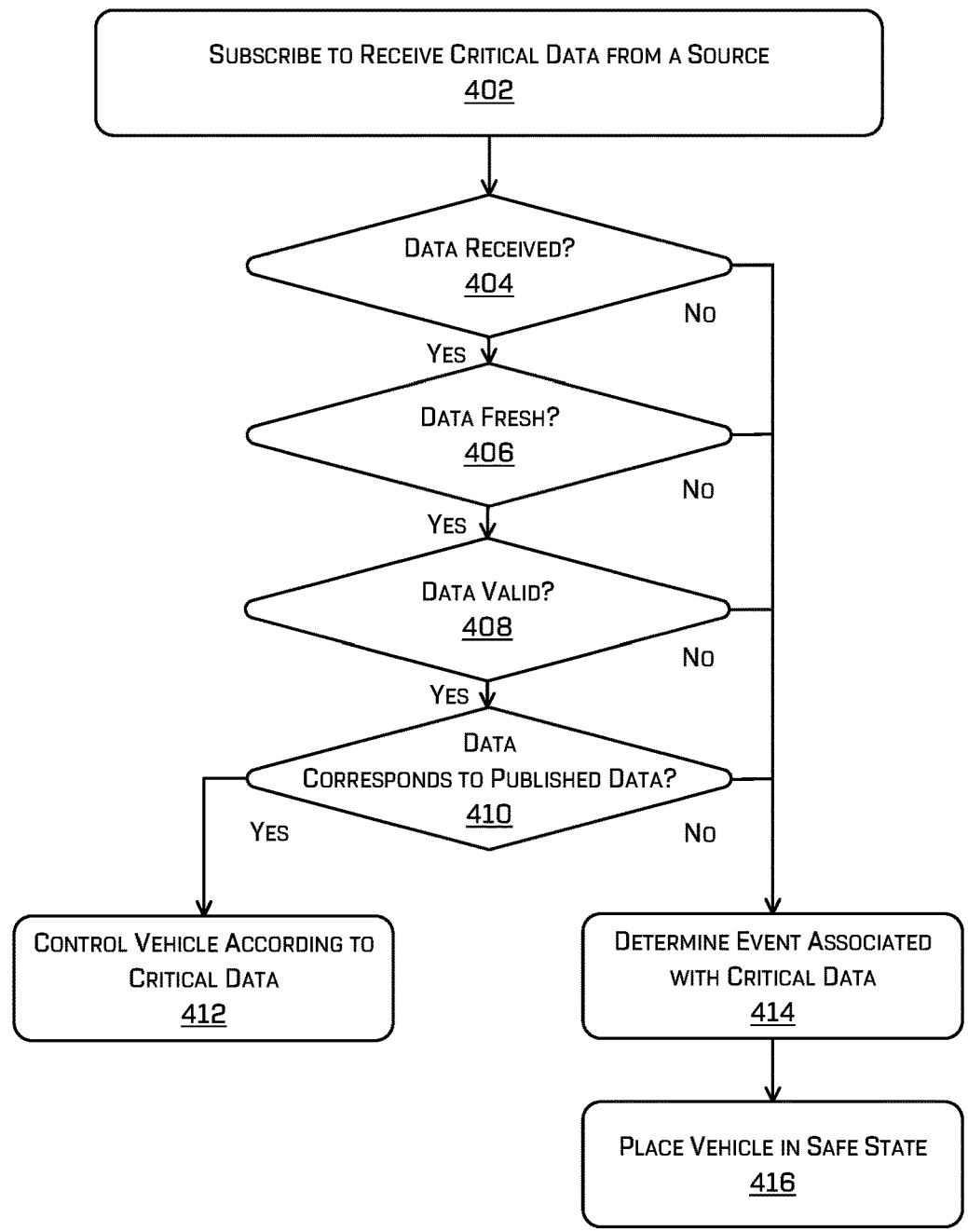
FIG. 4 is a flowchart illustrating an example method for transitioning to a safe stop in response to detecting an event associated with critical data, as described herein.
Figure 5:
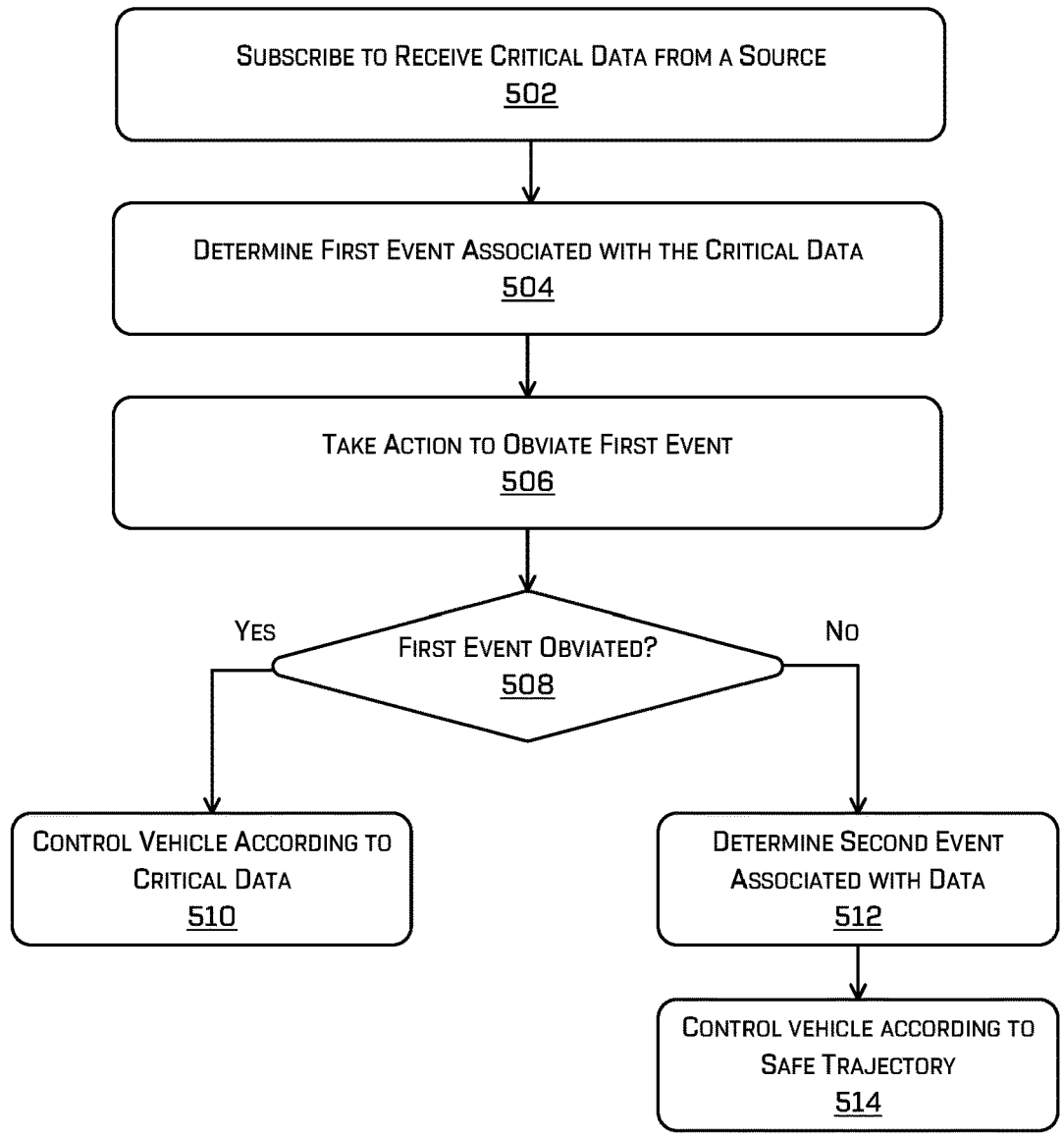
FIG. 5 is a flowchart illustrating another example method for mitigating events associated with critical data, as described herein.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for determining that an event associated with critical data has occurred and for placing the vehicle in a safe state in response to the event. For example, some or all of the process 400 can be performed by the vehicle computing system(s) 104, the subscriber 204 in FIGS. 2A and 2B, and/or by one or more of the components illustrated in FIG. 3, as described herein. For example, some or all of the process 400 can be performed by the vehicle computing system(s) 304 (e.g., using the critical data event component 330 and/or the safe state component 332) and/or by the client computing system(s) 338 (e.g., by the critical data event component 344 and/or the safe state component 346).

At operation 402, the process 400 includes subscribing to receive critical data from a source. For example, in systems described herein, data may be shared using a publication/subscription architecture, in which systems that generate data can publish that data for receipt by other systems, e.g., via a bus. Systems desiring to receive that published information may subscribe to topics about which the system would like to receive information. As noted above, the system may subscribe to many types of data, some of which may be critical data. In implementations described herein, critical data may be safety critical data, e.g., which may be information without which the system cannot safely operate. In other examples, critical data may be otherwise determined. In examples described herein, each system may require different critical data; data that is critical to one system may not be critical to other systems, and vice versa. Moreover, systems may require multiple types of critical data, and thus, at operation 402, may subscribe to receive multiple types or topics of critical data, e.g. from the same or multiple sources.

At operation 404, the process 400 may include determining whether the data was received. For example, and as described further herein, a system subscribing to receive critical data may require fresh or new critical data at predetermined periods. For example, the predetermined period may be associated with a publication frequency at which the source publishes the information. The publication frequency may vary based on the type of data, the capabilities and/or functionality of the publishing system, or other factors. In some examples, the period in which data is required to be received may be dynamically determined based on one or more attributes of the vehicle and/or the environment of the vehicle. For instance, and as described above in detail, the critical data event component 330 may consider objects in the environment and/or functionality of the vehicle to determine the time period. In some examples, the subscribing system may have an expectation to receive the published information in a range determined in accordance with the publication rate of the information. Thus, for example, when a certain type of critical data is published at a frequency of 10 Hz, the subscribing system will expect to receive a message containing new published data about every 0.1 seconds, e.g., between about 0.08 seconds or 0.12 seconds. In examples described herein, the system may expect to receive the critical information in a range including the expected time. If the system fails to receive this message, e.g., within a tolerance, the process 400 may proceed to operation 414, described below.

However, if at 404 the process determines that the critical data is received timely, at operation 406 the process 400 determines whether the data is fresh. For example, in some instances, the system may receive published data in an anticipated window, but the data may older than expected (or useful). For example, the publisher may be experiencing delays in processing new information and/or publishing information. Moreover, latency in the system may cause a delay in published information being received at the subscriber. In implementing the operation 406, techniques described herein can compare timestamps associated with the received data to determine whether the latency between publication and receipt is within a threshold latency. An example of these techniques is illustrated in FIG. 2B. As described in connection with that figure, the publisher may timestamp information upon publishing and the subscribing system can timestamp the data upon receipt. The difference in times associated with timestamps represents the age of the data, and if the data is too old, e.g., older than a threshold age for the specific type of data or the needs of the system, the process 400 can proceed to operation 414, described below. In some examples, an acceptable latency of the data may also be dynamically determined based on one or more attributes of the vehicle and/or the environment of the vehicle. For instance, and as described above in detail, the critical data event component 330 may consider objects in the environment and/or functionality of the vehicle to determine an acceptable latency that will ensure safe operation of the vehicle.

However, if at operation 406 the process determines that the critical data is fresh, i.e., equal to or below a threshold age, at operation 408 the process 400 may optionally determine whether the data is valid. For example, implementations described herein may check the received message to ensure that it includes all of the expected information. In other implementations, the message may be published with a header, and the operation 406 may determine whether the header has been dropped or altered. Other validity checks may also be used at operation 406 to verify the integrity of the message and/or data contained in the message. If the operation 406 determines that the data is not valid, the process 400 can proceed to the operation 414, described below.

However, if at operation 408 it is determined that the critical data is valid, at operation 410 the process 400 may determine whether the data received in the message corresponds to the published data. For example, at publication, messages may be subjected to a hash function, such as a cyclical redundancy check, or the like. Upon receipt, the subscriber may confirm that the data received corresponds to the published data, e.g., by verifying a checksum or comparing a hash to that of the received message. If the operation 408 determines that the received data does not correspond to the published data, the process 400 can proceed to the operation 414, described below.

However, if at operation 410 it is determined that the data corresponds to the published data, at operation 412 the process 400 may control the vehicle according to the critical data. For example, when the data is received, the data is fresh, the data is valid, and the data is the data published by the publisher, techniques described herein can determine that the critical data is as expected, and can be used by the system to perform system operations.

As noted above, however, if at operation 404, the data is not received, at option 406, the data is determined to be stale or too old, at operation 408 the data is determined to be invalid, and/or at operation 410 the data is determined to not correspond to the published data, the process 400 can, at operation 414, determine an event associated with the critical data. As noted above, the critical data may be necessary, e.g., essential, for safe operation of the vehicle. Failure to receive data that is fresh, valid, and confirmed to be from the publisher, may create an unsafe operating condition.

Accordingly, at operation 416 the process 400 can include placing the vehicle in a safe state. For example, when it is determined at operation 414 that an event associated with the critical data has occurred, techniques described herein can control the vehicle to mitigate the unsafe condition. As described herein, the safe state can be any number of states of the vehicle, including but not limited to, taking actions to limit non-critical functions, e.g., to alleviate undue network traffic and or processing, slowing the vehicle, executing a safe stop trajectory, or placing the vehicle in a no-go state, in which operations of the vehicle are disabled, causing an emitter to alert the passenger(s) and/or other entities, or the like.

FIG. 5 depicts another example process 500 for determining that events associated with critical data have occurred and taking action in response to those events. In some examples, the process 500 may include portions of the process 400, although the process 500 does not require the process 400 and the process 500 may have additional uses.

At operation 502, the process 500 includes subscribing to receive critical data from a source. For example, the operation 502 may be substantially identical to the operation 402, discussed above.

At operation 504, the process 500 determines a first event associated with the critical data. For example, the operation 504 may be substantially similar to the operation 414 described above with reference to FIG. 4. More specifically, an event may be determined at 504 in response to failing to receive published data in an expected receipt window. For example, as detailed above with reference to FIG. 2A, systems described herein may anticipate receiving published data substantially according to a predetermined period. Failing to receive critical data as expected may be an event associated with the data. Another event associated with the data may be a receipt of stale or aged data, as described above with reference to FIG. 2B. In such implementations, techniques described herein can compare a first timestamp associated with publication of the data to a second timestamp associated with receipt of the data. Received data is expected to have a latency, and receiving data outside of that acceptable or expected latency may comprise an event at operation 504, e.g., because the data may be too old. Similarly, the operation 504 may determine an event associated with the critical data when received data is invalid and/or does not correspond to published data. Such events are described in more detail above with regard to operations 408 and 410, respectively.

At operation 506, the process 500 can include taking an action to obviate the first event. For example, techniques described herein can attempt to remedy the issue or condition associated with the first event. By way of non-limiting example, when the event is associated with failure to receive expected critical data, the operation 506 can control the vehicle to limit network traffic, with the expectation that data may have been sent, but has been slowed because of an unexpected abundance of network traffic. For example, the operation 506 can cause the system to stop publishing data, e.g., non-critical data, and/or stop requesting non-critical published data. The operation 506 may take similar actions in response to determining that the received data is stale. For instance, excessive network traffic may result in increased latency, causing the staleness. In other implementations, the operation 506 can include relaxing standards or conditions associated with the first event. In some examples, the threshold time within which the data is to be received may be extended and/or the acceptable latency range may be increased. In some examples, the operation 506 can alternatively or additionally cause the vehicle to decelerate. Slowing the vehicle may allow for an extended reaction time, during which valid critical data may be received. Moreover, in some instances the threshold times associated with receipt of the critical data may be more relaxed. For instance, when the vehicle is travelling relatively slower, the vehicle may operate safely when receiving the critical data less frequently and/or with a larger associated latency.

At operation 508, the process 500 can include determining whether the first event has been obviated. For example, the operation 508 can determine that acceptable critical data has been received, e.g., in response to undertaking the remedial course of action. For instance, when network traffic is limited at 506, the critical data may be received, thereby obviating the first event (e.g., non-receipt of the message or receipt of stale information). Similarly, when the receipt and/or latency windows are extended, the critical data may be received in the new window and/or conform to the relaxed latency standard.

If, at operation 508, it is determined that the first event has been obviated, the process 500 can, at operation 510, control the vehicle according to the received critical data. For example, because the event has been obviated, normal operation of the vehicle can continue/resume. In some examples, control of the vehicle at 510 may include maintaining one or more restrictions applied as the action for obviating the event. For example, techniques described herein may maintain the state of the vehicle and/or systems of the vehicle that obviated the first event.

Alternatively, if it is determined at 508 that the first event has not been obviated, at operation 512 the process 500 may determine a second event associated with the data. For example, the second event may be the same as the first event, e.g., non-receipt of one or more critical messages, receipt of messages outside a predetermined latency range, receipt of invalid data, or the like. Alternatively, the second event may be different from the first event. For example, the first event may have been non-receipt of message with critical data, the system may have mitigated the first event by reducing network traffic, but messages received in response to reducing the network traffic may be stale, invalid, or otherwise unsuitable.

At operation 514 the process 500 can include controlling the vehicle according to a safe trajectory. For example, if the action is unable to remedy problems with the critical data, the vehicle may be brought to a safe stop. In some instances, the process 500 may control the vehicle to come to a stop on a side of the road.

Accordingly, in implementations of this disclosure, vehicle systems that require safety critical information can safely control the vehicle in the absence of such information.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example autonomous vehicle includes: one or more processors; and memory storing instructions that when executed cause the vehicle to perform operations comprising: subscribing to receive data from a source; determining an event associated with the data, the determining the event comprising at least one of: determining that data received from the source is older than a threshold age; or determining that data has not been received from the source for a threshold amount of time; based at least in part on determining the event, placing the vehicle in a safe state, the safe state comprising at least one of: controlling the vehicle to come to a safe stop; disabling features of the vehicle in a state in which the vehicle is stopped; or controlling a system of the autonomous vehicle to take an action to obviate the event.

B: The autonomous vehicle of example A, wherein the determining the event comprises determining that the data has not been received from the source for a threshold amount of time and the threshold amount of time is based, at least in part, on at least one of a frequency at which the data is published by the source, a type of the data, or the source of the data.

C: The autonomous vehicle of example A or example B, wherein the determining the event comprises determining that the data received from the source is older than the threshold age, wherein the threshold age is based at least in part on at least one of a type of the data, a frequency at which the data is published, or the source of the data.

D: The autonomous vehicle of any one of example A through example C, wherein the source comprises a computing system on the autonomous vehicle and the data comprises at least one of data associated with objects in an environment of the vehicle or data associated with a trajectory of the vehicle.

E: An example method includes: subscribing, at a system associated with an autonomous vehicle, to receive data from a source; determining an event associated with the data, the event comprising at least one of: determining that data received from the source is older than a threshold age; determining that data has not been received from the source for a threshold amount of time; determining that the data received from the source is invalid; or determining that the data received from the source differs from data published by the source; and based at least in part on determining the event, controlling the autonomous vehicle to alter a state of the autonomous vehicle.

F: The method of example E, wherein at least one of: the source comprises at least one of a computing system or a sensor on the autonomous vehicle and the data comprises critical information, the critical information comprising at least one of sensor data generated by the sensor, data generated based at least in part on the sensor data, or data associated with a trajectory of the vehicle; or the source comprises a remote computing system remote from the autonomous vehicle and the data comprises a message output by the remote computing system at a period.

G: The method of example E or example F, further comprising: receiving object data about an environment of the vehicle; determining operational data about the vehicle; and determining the threshold age or the threshold amount of time based at least in part on the object data and the operational data.

H: The method of any one of example E through example G, wherein the determining the event comprises determining that the data received from the source is older than the threshold age, wherein the threshold age is based at least in part on at least one of a type of the data, a frequency at which the data is published, or the source of the data.

I: The method of any one of example E through example H, wherein the determining that the data received from the source is older than the threshold age comprises: determining, based on a first time stamp associated with the data, a first time at which the source published the data; determining, based on a second time stamp associated with the system, a second time at which the data is received; and comparing a difference between the first time and the second time to the threshold age.

J: The method of any one of example E through example I, wherein the determining the event comprises determining that the data has not been received from the source for a threshold amount of time and the threshold amount of time is based, at least in part, on at least one of a frequency at which the data is published by the source, a type of the data, or the source of the data.

K: The method of any one of example E through example J, wherein the controlling the autonomous vehicle to alter the state of the autonomous vehicle comprises at least one of: controlling the vehicle to come to a safe stop; altering one or more subsystems of the system; or taking a mitigating action to obviate the event L: The method of any one of example E through example I, wherein the event is a first event and the altering the state of the vehicle comprises taking a mitigation action to obviate the event, the method further comprising: determining a second event associated with the data; and based at least in part on the second event, controlling the vehicle to come to a safe stop.

M: The method of any one of example E through example L, wherein the first event is determined at a first time and the second event is determined at a second time, after the first time.

N: The method of any one of example E through example M, wherein the determining the first event comprises determining that the data has not been received from the source for a first threshold amount of time and the determining the second event comprises determining that the data has not been received from the source for a second threshold amount of time.

O: The method of any one of example E through example N, wherein the determining the first event comprises determining that the data received from the source differs from the data published by the source, the determining that the data received from the source differs from the data published by the source comprises comparing a first hash received with the data to a second hash generated by the system.

P: An example system includes: one or more processors; and memory storing instructions that when executed cause the system to perform operations comprising: subscribing to receive data published by a source; determining an event associated with the data, the determining the event comprising at least one of: determining that data received from the source is older than a threshold age; determining that data has not been received from the source for a threshold amount of time; determining that the data received from the source is invalid; or determining that the data received from the source differs from data published by the source; and based at least in part on determining the event, generating a control to alter a state of an autonomous vehicle.

Q: The system of example P, wherein the event is a first event and the altering the state of the autonomous vehicle comprises controlling the vehicle to take a first action to obviate the event, the method further comprising: based at least in part on a second event, controlling the vehicle to come to a safe stop.

R: The system of example P or example Q, wherein the first action comprises at least one of discontinuing receipt of non-critical messages, reducing a velocity of the vehicle, discontinuing publishing non-critical messages, or altering one or more components of the vehicle.

S: The system of any one of example P through example R, wherein the threshold age comprises a first threshold age, the threshold amount of time comprises a first threshold amount of time, the first action comprises controlling the vehicle to decelerate from a current speed, and wherein the second event comprises at least one of: determining that data received from the source is older than a second threshold age; or determining that the data has not been received from the source for a second threshold amount of time, longer than the first threshold amount of time.

T: The system of any one of example P through example S, the operations further comprising: receiving object information about one or more objects in an environment of the autonomous vehicle; receiving operational information about the autonomous vehicle; and determining at least one of the threshold age or the threshold amount of time based at least in part on the object information and the operational information.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A method comprising:
    subscribing, to receive data from a first subsystem of an autonomous vehicle at a second subsystem;
    determining, at the second subsystem, that the data is critical data, the critical data being required for a performing a function of the second subsystem;
    determining, at the second subsystem, a criticality threshold associated with the data, wherein the criticality threshold is:
        indicative of impact of the data on performing a function of the second subsystem, and
        based at least in part on a speed of the autonomous vehicle or the function;
    determining, at the second subsystem, whether the data satisfies the criticality threshold;
    based on determining that the data does not satisfy the criticality threshold, generating an event associated with the data, the event indicating that the function of the second subsystem is impacted; and
    based at least in part on determining the event, controlling the autonomous vehicle to alter a state of the autonomous vehicle.

2. The method of claim 1, wherein:
    the data comprises information indicating objects in an environment traversed by the autonomous vehicle, and
    the function comprises navigation of the autonomous vehicle in the environment.

3. The method of claim 2, wherein the criticality threshold is based at least in part on a number of objects indicated in the data or a stopping time of the autonomous vehicle.

4. The method of claim 1, wherein the criticality threshold is further based at least in part on at least one of a type of the data, a frequency at which the data is published, or the first subsystem of the autonomous vehicle.

5. The method of claim 4, wherein the criticality threshold is indicative of a maximum age of the data received from the first subsystem, the method further comprising:
    determining, based on a first time stamp associated with the data, a first time at which the first subsystem of the autonomous vehicle published the data; and
    determining, based on a second time stamp associated with the second subsystem, a second time at which the data is received,
    wherein determining whether the data satisfies the criticality threshold is based on comparing a difference between the first time and the second time to the criticality threshold.

6. The method of claim 1, wherein the event is a first event, the method comprising:
    determining a second event comprising determining that the data has not been received from the first subsystem of the autonomous vehicle for a threshold amount of time,
    wherein the threshold amount of time is based, at least in part, on at least one of a frequency at which the data is published by the first subsystem of the autonomous vehicle, a type of the data, or the first subsystem of the autonomous vehicle.

7. The method of claim 1, wherein the controlling the autonomous vehicle to alter the state of the autonomous vehicle comprises at least one of:
controlling the autonomous vehicle to come to a safe stop;
disabling features of the autonomous vehicle in a state in which the vehicle is stopped;
altering one or more additional subsystems of the autonomous vehicle; or
taking a mitigating action to obviate the event.

8. The method of claim 1, wherein the event is a first event determined at a first time and the altering the state of the autonomous vehicle comprises taking a mitigation action to obviate the event, the method further comprising:
determining a second event associated with the data, the second event being determined at a second time, after the first time; and
based at least in part on the second event, controlling the vehicle to come to a safe stop.

9. A system comprising:
one or more processors; and
memory storing instructions that when executed cause the system to perform operations comprising:
subscribing to receive data published by a first subsystem of an autonomous vehicle at a second subsystem of the autonomous vehicle;
determining, at the second subsystem, that the data is critical data, the critical data being required for a performing a function of the second subsystem;
determining, at the second subsystem, a criticality threshold associated with the data, wherein the criticality threshold is:
indicative of impact of the data on performing the function, and
based at least in part on a speed of the autonomous vehicle or the function;
determining, at the second subsystem, whether the data satisfies the criticality threshold;
based on determining that the data does not satisfy the criticality threshold, generating an event associated with the data, the event indicating that the function of the second subsystem is impacted; and
based at least in part on determining the event, generating a control to alter a state of the autonomous vehicle.

10. The system of claim 9, wherein the event is a first event and the altering the state of the autonomous vehicle comprises controlling the vehicle to take a first action to obviate the event, the operations further comprising:
based at least in part on a second event, controlling the vehicle to come to a safe stop.

11. The system of claim 10, wherein the first action comprises at least one of discontinuing receipt of non-critical messages, reducing a velocity of the autonomous vehicle, discontinuing publishing non-critical messages, or altering one or more components of the autonomous vehicle.

12. The system of claim 10, wherein the first action comprises controlling the autonomous vehicle to decelerate from a current speed, and wherein the second event comprises at least one of:
determining that data received from the first subsystem of the autonomous vehicle is older than a threshold age; or
determining that the data has not been received from the first subsystem of the autonomous vehicle for a threshold amount of time.

13. The system of claim 9, wherein the data comprises object information about one or more objects in an environment of the autonomous vehicle, and the operations further comprising:
receiving operational information about the autonomous vehicle,
wherein the criticality threshold is based at least in part on the object information and the operational information.

14. The system of claim 9, wherein the event is a first event, the operations further comprising:
receiving, at the second subsystem, a first hash value generated at the first subsystem;
generating, at the second subsystem, a second hash value based on content of the received data;
determining a difference between the first hash value and the second hash value; and
based on determining the difference, generating a second event associated with the data.

15. The system of claim 9, wherein the criticality threshold is based, at least in part, on a time interval between data required for performing the function of at the second subsystem.

16. The system of claim 9, the data comprises information associated with at least one of: objects in an environment, a location of the vehicle, or a trajectory of the autonomous vehicle.

17. The method of claim 1, wherein the event is a first event, the method further comprising:
receiving, at the second subsystem, a first hash value generated at the first subsystem, the first hash value being based on content of the data published by the first subsystem;
generating, at the second subsystem, a second hash value based on content of the received data;
determining a difference between the first hash value and the second hash value; and based on determining the difference, generating a second event associated with the data.

18. The method of claim 1, wherein the data comprises identification of a road network, and the function comprises planning a trajectory of the autonomous vehicle.

19. The system of claim 9, wherein the criticality threshold is indicative of a maximum age of the data received from the first subsystem, the operations further comprising:
determining, based on a first time stamp associated with the data, a first time at which the first subsystem of the autonomous vehicle published the data; and
determining, based on a second time stamp associated with the second subsystem, a second time at which the data is received at the second subsystem,
wherein determining whether the data satisfies the criticality threshold is based on comparing a difference between the first time and the second time to the criticality threshold.

20. The system of claim 9, wherein the criticality threshold is based at least in part on a number of objects indicated in the data or a time required to bring the autonomous vehicle to a stop.

* * * * *